US012682272B2

(12) United States Patent

Macquarrie

(10) Patent No.: US 12,682,272 B2
(45) Date of Patent: Jul. 14, 2026

(54) CONTROL OF HYPERFINE INTERACTION IN BROKER-CLIENT SYSTEMS

(71) Applicant: PHOTONIC INC., Coquitlam (CA)

(72) Inventor: Evan Macquarrie, Burnaby (CA)

(73) Assignee: Photonic Inc., Coquitlam (CA)

( * ) Notice: Subject to any disclaimer, the term of this patent is extended or adjusted under 35 U.S.C. 154(b) by 0 days.

(21) Appl. No.: 18/861,522

(22) PCT Filed: Jun. 8, 2023

(86) PCT No.: PCT/CA2023/050788
§ 371 (c)(1),
(2) Date: Oct. 29, 2024

(87) PCT Pub. No.: WO2023/235979
PCT Pub. Date: Dec. 14, 2023

(65) Prior Publication Data
US 2025/0285001 A1     Sep. 11, 2025

Related U.S. Application Data

(60) Provisional application No. 63/366,085, filed on Jun. 9, 2022.

(51) Int. Cl.
*G06N 10/70*          (2022.01)
*G06N 10/80*          (2022.01)

(52) U.S. Cl.
CPC ............. *G06N 10/70* (2022.01); *G06N 10/80* (2022.01)

(58) Field of Classification Search
CPC ................................ G06N 10/70; G06N 10/80
See application file for complete search history.

(56) References Cited

U.S. PATENT DOCUMENTS

| | | | |
|---|---|---|---|
| 9,774,401 B1 | 9/2017 | Borrill | |
| 9,858,531 B1 | 1/2018 | Monroe et al. | |

(Continued)

FOREIGN PATENT DOCUMENTS

| | | |
|---|---|---|
| WO | 2022020951 A1 | 2/2022 |

OTHER PUBLICATIONS

Universal Set of Gates for Microwave Dressed-State Quantum Computing (Year: 2015).*

(Continued)

*Primary Examiner* — Bryce P Bonzo
*Assistant Examiner* — Audrey Emma Whitesell
(74) *Attorney, Agent, or Firm* — Oyen Wiggs Green & Mutala LLP

(57) ABSTRACT

Methods and systems for protecting a quantum state of a client quantum system of a broker-client system are disclosed. The client-broker system comprises the client quantum system and a broker quantum system coupled by a hyperfine interaction. The method comprises suppressing the hyperfine interaction by applying an electromagnetic dressing field to the client-broker system in the presence of a first magnetic field. The electromagnetic dressing field comprises a second magnetic field that oscillates in a direction perpendicular to the first magnetic field. While the hyperfine interaction is suppressed, a quantum state of the broker quantum system may be altered by steps including optically exciting the broker quantum system. The method may be applied to reduce decoherence of the quantum state of the client quantum system while resetting a quantum state of the broker quantum system.

19 Claims, 8 Drawing Sheets

(56)          References Cited

U.S. PATENT DOCUMENTS

| | | | |
|---|---|---|---|
| 10,587,277 | B2 | 3/2020 | Hincks et al. |
| 11,397,343 | B2 | 7/2022 | Faraon et al. |
| 11,423,115 | B2 | 8/2022 | Lanting |
| 11,494,683 | B2 | 11/2022 | Amin et al. |
| 11,710,579 | B2 | 7/2023 | Keesling Contreras et al. |
| 12,282,827 | B2 | 4/2025 | Huggins et al. |
| 2005/0167772 | A1 | 8/2005 | Stoneham et al. |
| 2012/0319684 | A1 | 12/2012 | Gambetta et al. |
| 2014/0142915 | A1 | 5/2014 | Manipatruni et al. |
| 2014/0291490 | A1 | 10/2014 | Hanson et al. |
| 2015/0009746 | A1* | 1/2015 | Kucsko .................. B82Y 10/00 365/152 |
| 2016/0093420 | A1 | 3/2016 | Urzhumov |
| 2018/0107938 | A1 | 4/2018 | Morello et al. |
| 2018/0330266 | A1* | 11/2018 | Simmons .............. B82Y 10/00 |
| 2021/0142203 | A1 | 5/2021 | Simmons et al. |
| 2021/0211271 | A1 | 7/2021 | Kuang et al. |
| 2021/0279624 | A1 | 9/2021 | Oliver et al. |
| 2022/0044719 | A1 | 2/2022 | Li et al. |
| 2022/0050043 | A1 | 2/2022 | Ozdemir et al. |
| 2022/0165943 | A1 | 5/2022 | Kim et al. |
| 2022/0187841 | A1 | 6/2022 | Ebrahimi Afrouzi et al. |
| 2022/0209036 | A1 | 6/2022 | Diggins |
| 2022/0217211 | A1 | 7/2022 | Scarfutti et al. |
| 2022/0269974 | A1 | 8/2022 | Bhaskar et al. |
| 2022/0366290 | A1* | 11/2022 | Simmons .............. G06N 10/20 |
| 2022/0366494 | A1 | 11/2022 | Cella et al. |
| 2022/0374239 | A1 | 11/2022 | Freedman et al. |
| 2023/0090257 | A1* | 3/2023 | Stern ...................... G01C 17/32 324/252 |
| 2023/0283280 | A1 | 9/2023 | Simmons et al. |
| 2023/0292633 | A1 | 9/2023 | Kranz et al. |
| 2023/0297870 | A1 | 9/2023 | Aeppli et al. |
| 2024/0157146 | A1 | 5/2024 | Howard |
| 2024/0186007 | A1 | 6/2024 | Howard |
| 2024/0319304 | A1 | 9/2024 | Manassen |
| 2024/0338583 | A1 | 10/2024 | Zwierlein et al. |
| 2025/0217687 | A1 | 7/2025 | Awschalom et al. |

OTHER PUBLICATIONS

Restoring Narrow Linewidth to a Gradient-Broadend Magnetic Resonance by Inhomogeneous Dressing (Year: 2019).*

Goldman, M. L. et al., "Optical Control of a Single Nuclear Spin in the Solid State", Physical Review Letters, vol. 124, No. 15, Apr. 1, 2020.

Golter, D. A. et al., "Protecting a Solid-State Spin from Decoherence Using Dressed Spin States", Physical Review Letters, vol. 113, No. 23, Dec. 1, 2014.

Wu, L.-A., "Dressed Qubits in Nuclear Spin Baths", arXiv:0912. 1804v2 [quat-ph], Cornell University Library, Dec. 9, 2009.

Barrett, S.D. et al., "Efficient high-fidelity quantum computation using matter qubits and linear optics", Phys Rev A 71, 060310(R) (2005).

Benjamin, S.C. et al., "Brokered graph-state quantum computation", New J. Phys. 8, 141 (2006).

Bernien, H. et al., "Heralded entanglement between solid-state qubits separated by three meters", Nature 497, 86-90 (2013).

Blok, M.S. et al., "Towards quantum networks of single spins: analysis of a quantum memory with an optical interface in diamond", Faraday Discuss., 184, 173 (2015).

Cabrillo, C. et al., "Creation of entangled states of distant atoms by interference", Phys Rev A 59, 1025 (1999).

Childress, L. et al., "Coherent Dynamics of Coupled Electron and Nuclear Spin Qubits in Diamond", Science 314, 5797 (2006).

Fuchs, G.D. et al., "Gigahertz Dynamics of a Strongly Driven Single Quantum Spin", Science 326, 5959 (2009).

Hermans, S.L.N. et al., "Qubit teleportation between non-neighbouring nodes in a quantum network", Nature 605, 633-668 (2022).

Jiang, L. et al., "Coherence of an optically illuminated single nuclear spin qubit", Phys Rev Lett 100, 073001 (2008.

Kalb, N. et al., "Dephasing mechanisms of diamond-based nuclear-spin memories for quantum networks", Phys Rev A 97, 062330 (2018).

Pompili, M. et al., "Realization of a multi-node quantum network of remote solid-state qubits", Science, 372, 6539 (2021).

Reiserer, A. et al., "Robust Quantum-Network Memory Using Decoherence-Protected Subspaces of nuclear Spins", Phys Rev X 6, 021040 (2016).

Van Der Sar, T. et al., "Decoherence-protected quantum gates for a hybrid solid-state spin register", Nature, Apr. 5, 2013, vol. 484, pp. 82-86.

Vandersypen, L.M.K. et al., "NMR Techniques for Quantum Control and Computation", arXiv, Jun. 10, 2004, vol. quantph(0404064-V2), pp. 1-33.

Fuchs, M. et al., "Spin decoherence in graphene quantum dots due to hyperfine interaction", Physical Review B 86, 085301, Aug. 1, 2012.

Witzel, W. M. et al., "Decoherence induced by anisotropic hyperfine interaction in Si spin qubits", Physical Review B 76, 03512, Jul. 31, 2007.

* cited by examiner

90

95A    95B
95
94
92
91    93

SENSORS    102

REFRIGERATOR    96

MAGNET    97

LIGHT SOURCE    98

RF SOURCE    99

ELECTRIC FIELD SOURCE    100

CONTROL SYSTEM    101

CONTROL OF HYPERFINE INTERACTION IN BROKER-CLIENT SYSTEMS

CROSS-REFERENCE TO RELATED APPLICATIONS

This application claims priority from U.S. application No. 63/366,085 filed 9 Jun. 2022 and entitled CONTROL OF HYPERFINE INTERACTION IN BROKER-CLIENT SYSTEMS which is hereby incorporated herein by reference for all purposes. For purposes of the United States of America, this application claims the benefit under 35 U.S.C. § 119 of U.S. application No. 63/366,085 filed 9 Jun. 2022 and entitled CONTROL OF HYPERFINE INTERACTION IN BROKER-CLIENT SYSTEMS which is hereby incorporated herein by reference for all purposes.

FIELD

This invention relates to quantum mechanics and, in particular to methods and apparatus for preserving the quantum state of a quantum system in the presence of noise. An example application of the present technology is preserving the state of a client qubit in a client-broker system while attempting entanglement of a broker qubit of the client-broker system.

BACKGROUND

Quantum states of quantum systems may be used to store information. Since quantum systems can exist in superpositions of different quantum states the stored information may be defined by a particular superposition of quantum states. For example, a particular quantum system may have first and second quantum basis states: $|\psi 1\rangle$ and $|\psi 2\rangle$. Information may be stored in the quantum system by setting the system to a quantum state given by the superposition: $\alpha|\psi 1\rangle + \beta|\psi 2\rangle$ where $\alpha$ and $\beta$ are complex valued coefficients.

A problem with storing information in a quantum system is that the information can become randomized as a result of external interactions in a process called "decoherence". "Noise" of any type including exposure to light, other electromagnetic radiation, or fluctuating electric or magnetic fields can increase the rate of decoherence. Coupling a quantum system to interact with external systems reduces isolation of the quantum system and can increase the rate of decoherence (and reduce the characteristic time over which decoherence occurs)

Sometimes quantum information is manipulated in a system that includes a "client/broker" arrangement. In a client broker arrangement, a first quantum system (acting as "client") and a second quantum system (acting as "broker") cooperate to work with quantum information. A broker-client pair may be arranged so that interactions with external systems only involve the broker. The client may interact only with the broker. For example, interactions between a broker and a corresponding client may be used to: store quantum information in the corresponding client and/or manipulate quantum information stored in the client (e.g. by applying a quantum gate) and/or transmit quantum information from the client to another location (e.g. by quantum teleportation).

A client/broker arrangement can provide the advantage that the client is relatively protected from noise and may have a long decoherence time. However, in general a client and corresponding broker are coupled (e.g. by electromagnetic fields, wavefunction overlap, or other coupling). Consequently, actions applied to the broker (e.g. to initialize the broker in a particular quantum state or to entangle the quantum state of the broker with the quantum state of one or more external quantum systems) may create "noise" at the client which may cause the decoherence time for the client to be reduced and/or randomize information about a quantum state stored in the client so that the information becomes unavailable.

The following references provide background to the present technology:

[1] Bernien, et al, Nature 497, 86-90 (2013).
[2] Pompili, et al, Science, 372, 6539 (2021).
[3] Hermans, et al, arXiv: 2110.11373 (2021).
[4] Barrett, et al, Phys Rev A 71, 060310(R) (2005).
[5] Cabrillo, et al, Phys Rev A 59, 1025 (1999).
[6] Benjamin, et al, New J. Phys. 8, 141 (2006).
[7] Blok, et al, Faraday Discuss. 184, 173 (2015).
[8] Jiang, et al, Phys Rev Lett 100, 073001 (2008).
[9] Kalb, et al, Phys Rev A 97, 062330 (2018).
[10] Reiserer, et al, Phys Rev X 6, 021040 (2016).
[11] Fuchs, et al, Science 326, 5959 (2009).
[12] S. D. Barrett, et al, PRA 71, 060310R (2005).

There is a need for methods and systems that facilitate the use of client/broker arrangements while extending the lifetime of quantum states of the client.

SUMMARY

The present technology has a number of aspects that include, without limitation:

methods for reducing or suppressing a hyperfine interaction between to quantum systems (e.g. two spins);

systems operative to reduce or suppress a hyperfine interaction between to quantum systems;

methods for resetting a broker quantum system while reducing or eliminating dephasing of an associated client quantum system; and systems that include a broker-client quantum system that includes a broker quantum system and at least one client quantum system and are configured to reset a broker quantum system while reducing or eliminating dephasing of at least one associated client quantum system.

One example aspect of the invention provides a method for protecting a quantum state of a client quantum system of a broker-client system comprising the client quantum system and a broker quantum system coupled by a hyperfine interaction. The method comprises suppressing the hyperfine interaction by applying an electromagnetic dressing field to the client-broker system in the presence of a first magnetic field, the electromagnetic dressing field comprising a second magnetic field that oscillates in a direction perpendicular to the first magnetic field. The first magnetic field may be static.

While the hyperfine interaction is suppressed the method may alter a quantum state of the broker quantum system by steps including optically exciting the broker quantum system. In some embodiments altering the quantum state of the broker quantum system comprises resetting the quantum state of the broker quantum system to a predetermined initial quantum state.

In some embodiments, the dressing field has a frequency and amplitude selected to cause eigenstates of the Hamiltonian of the broker-client system to change from a bare basis made up of combinations of a pure state of the client quantum system and a pure state of the broker quantum system to a dressed basis made up of combinations of pure states of the client quantum system and coherent superpositions of original pure states of the broker quantum system.

In some embodiments, the dressing field has a frequency and amplitude selected to cause eigenstates of the Hamiltonian of the broker-client system to change from a bare basis to a dressed basis wherein, in the dressed basis, energy levels of ground quantum states of the client quantum system are independent of energy levels of the broker quantum system.

In some embodiments, the dressed basis comprises the states $\{+\Uparrow; +\Downarrow; -\Uparrow; -\Downarrow\}$ where + represents the state $$\frac{1}{\sqrt{2}}(|\uparrow> + |\downarrow>)$$

of the broker quantum system, − represents the state $$\frac{1}{\sqrt{2}}(|\uparrow> - |\downarrow>)$$

of the broker quantum system, single arrows $\uparrow$ and $\downarrow$ represent spin of the broker quantum system in the direction of the first magnetic field and double arrows $\Uparrow$ and $\Downarrow$ represent spin of the client quantum system in the direction of the first magnetic field.

In some embodiments, the bare basis comprises the states $\{\uparrow\Uparrow; \uparrow\Downarrow; \downarrow\Uparrow; \downarrow z, 38\}$ in which single arrows $\uparrow$ and $\downarrow$ represent spin of the broker quantum system in the direction of the first magnetic field and double arrows $\Uparrow$ and $\Downarrow$ represent spin of the client quantum system in the direction of the first magnetic field.

In some embodiments, the broker quantum system and the client quantum system are respectively provided by an intrinsic spin of a first particle and an intrinsic spin of a second particle.

In some embodiments, the broker quantum system comprises an electron spin and the client quantum system comprises a nuclear spin.

In some embodiments, the electron spin and nuclear spin both belong to a luminescent centre in a crystalline substrate.

In some embodiments, a frequency of the dressing field is equal to the broker spin splitting resulting from the Zeeman spin splitting of the broker quantum system plus a detuning value.

In some embodiments, the detuning value is in the range of −10 MHz to +10 MHz.

In some embodiments, the dressing field is given by $$B_x = \Omega \exp[-i(\gamma_c B_z + \Delta)t]$$

where Bx is a magnitude of the dressing field, $\gamma_c$ is gyromagnetic ratio for the client quantum system, Bz is the magnitude of the first magnetic field, $\Omega$ is an amplitude of the dressing field, $\Delta$ is the detuning value, and t is time.

In some embodiments, in the dressed state the broker quantum system has a plurality of ground state energy levels and optically exciting the broker quantum system comprises controlling a light source to apply an optical pumping pulse to the client-broker system, the optical pumping pulse having a frequency corresponding to a transition from a first one of the ground state energy levels to an excited state of the broker quantum system.

In some embodiments, the broker quantum system is optically coupled to an optical resonator, the optical resonator tuned to a frequency corresponding to a transition from a second one of a plurality of ground state energy levels of the broker quantum system to the excited state of the broker quantum system.

Another example aspect of the invention provides a method for preserving coherence in a first quantum system of a node. The node further comprises a second quantum system coupled to the first quantum system by a local interaction. The method comprises detecting an imminent operation involving the second quantum system and associated with decoherence of the first quantum system; suppressing the local interaction between the first quantum system and the second quantum system; and executing the operation having suppressed the local interaction.

In some embodiments, the operation includes a reset of the second quantum system.

In some embodiments, the operation is an entanglement attempt involving the second quantum system.

In some embodiments, the local interaction is a hyperfine interaction.

In some embodiments, suppressing the local interaction includes turning off the local interaction.

In some embodiments, suppressing includes applying a continuous microwave magnetic field to dynamically decouple the first quantum system from the second quantum system.

In some embodiments, suppressing includes applying a continuous radiofrequency field to dynamically decouple the first quantum system from the second quantum system.

In some embodiments, the second quantum system is optically coupled to an optical resonator, the second quantum system having a first spin-conserving optical transition and a second spin-conserving optical transition, wherein the first spin-conserving optical transition is detuned from a resonant frequency of the optical resonator.

In some embodiments, the first spin-conserving optical transition has lower Purcell enhancement in comparison to the second spin-conserving optical transition.

In some embodiments, a magnitude of the microwave magnetic field measured in frequency units is at least five times an optical linewidth of the first spin-conserving optical transition.

Another aspect of the invention provides a controller operable to control an apparatus to perform any one of the methods described herein.

Another aspect of the invention provides an apparatus comprising a broker-client system comprising a client quantum system and a broker quantum system coupled by a hyperfine interaction. The apparatus further comprises a controller operable to control the apparatus to: suppress the hyperfine interaction by applying an electromagnetic dressing field to the client-broker system in the presence of a first magnetic field, the electromagnetic dressing field comprising a second magnetic field that oscillates in a direction perpendicular to the first magnetic field; and, while the hyperfine interaction is suppressed, alter a quantum state of the broker quantum system by performing steps including optically exciting the broker quantum system.

Another aspect of the invention provides an apparatus comprising a node comprising a first quantum system and a second quantum system, wherein the second quantum system is coupled to the first quantum system by a local interaction. The node further comprises a controller operable to control the apparatus to: detect an imminent operation involving the second quantum system and associated with decoherence of the first quantum system; suppress the local interaction between the first quantum system and the second quantum system; and execute the operation having suppressed the local interaction.

Another aspect of the invention provides apparatus having any new and inventive feature, combination of features, or sub-combination of features as described herein.

Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
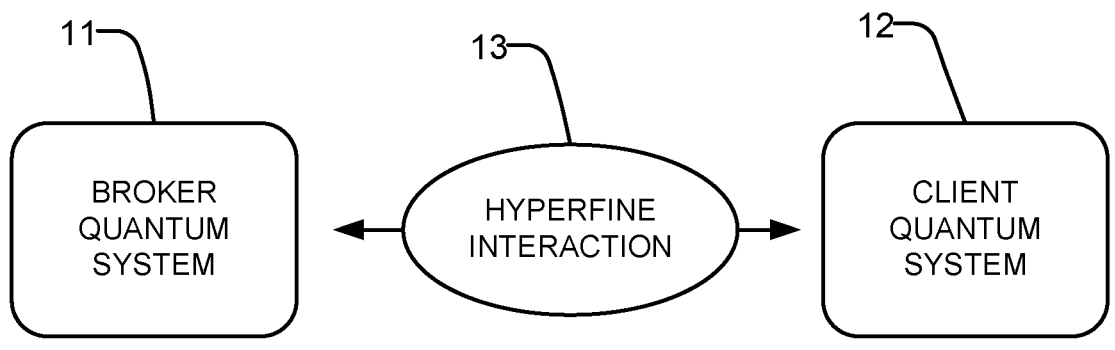
FIG. 1 is a schematic drawing showing a portion of a system which includes a first quantum system that may be used as a broker and a second quantum system that may be used as a client.

FIG. 1 schematically illustrates a portion of a system which includes a first quantum system 11 that may be used as a broker and a second quantum system 12 that may be used as a client. "Quantum system" means a system that has practical application for storing and/or manipulating quantum information. A quantum system supports plural quantum states and superpositions of at least two supported quantum states. Examples of quantum systems are spins (e.g. electron spins, nuclear spins), qubits, qutrits, quantum dots, damage centers such as T, I and M centers, NV centers, impurity atoms in silicon or other substrates and collections of two or more of these. In some embodiments quantum systems 11 and 12 may each comprise an intrinsic spin of a quantum particle. For example quantum system 11 may comprise an electron or hole spin. For example, quantum system 12 may comprise a nuclear spin. Quantum systems 11 and 12 interact by the hyperfine interaction 13.

Figure 2:
FIG. 2 is a schematic energy level diagram that illustrates energy levels associated with quantum states of an example broker quantum system in the presence of a magnetic field in the high field limit.
Figure 2:
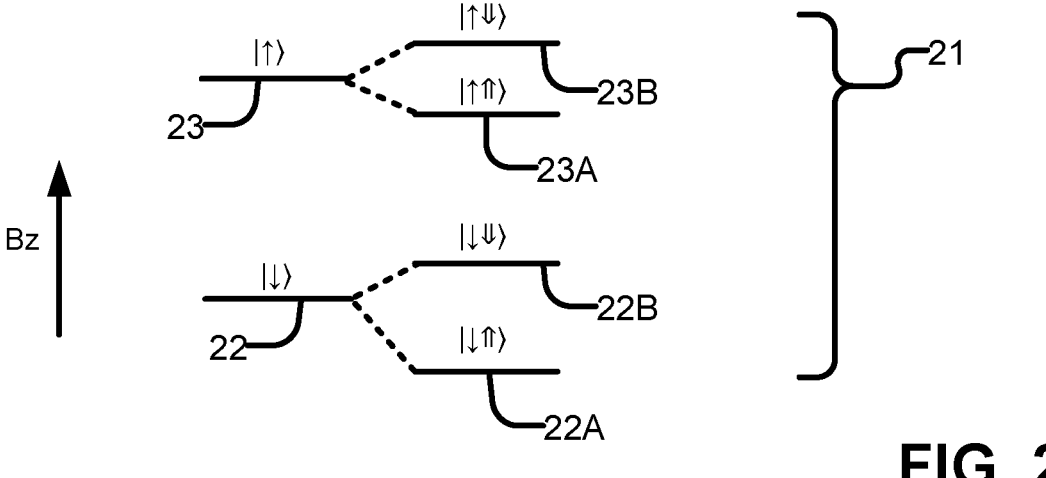

FIG. 2 is a schematic energy level diagram that illustrates energy levels associated with quantum states of an example broker quantum system 11 in the presence of a magnetic field Bz in the high field limit. Bz may be a static magnetic field. The orientation of Bz defines a z direction.

A ground state 21 is split into two levels 22 and 23. Level 22 corresponds to quantum system 11 being spin down (i.e. in the state $|\downarrow>$). Level 23 corresponds to quantum system 11 being spin up (i.e. in the state $|\uparrow>$).

Broker quantum system 11 also has an excited state 24. Excited state 24 may, for example be reached from ground state 21 by an orbital transition.

Levels 22 and 23 are each split into two levels by hyperfine splitting which arises from interactions with client quantum system 12. Level 22 is split into states 22A and 22B which respectively correspond to states in which client quantum system 12 is spin up (i.e. the combined state of quantum systems 11 and 12 is $|\downarrow \Uparrow>$) and client quantum system 12 is spin down (i.e. the combined state of quantum systems 11 and 12 is $|\downarrow \Downarrow>$). Similarly level 23 is split into states 23A and 23B which respectively correspond to states in which client quantum system 12 is spin up (i.e. the combined state of quantum systems 11 and 12 is $|\uparrow \Uparrow>$) and client quantum system 12 is spin down (i.e. the combined state of quantum systems 11 and 12 is $|\uparrow \Downarrow>$).

Broker quantum system 11 and client quantum system 12 may, for example, exist in a solid state host material. For example, broker quantum system 11 and client quantum system 12 may each be provided by spins associated with the same physical structure. The physical structure may, for example be: an impurity atom in a substrate (e.g. a silicon substrate), a colour center in a crystalline material (e.g. the SiV or NV centres in diamond or the T centre, I centre or M centre in silicon).

A physical structure that includes several atoms of specified elements may have properties that depend upon which isotopes of the elements are present in a particular instance of the physical structure. For example, a T centre includes two carbon atoms as well as one hydrogen atom. $^{13}C$ and $^{12}C$ are two isotopes of carbon. There are therefore four possible combinations of $^{13}C$ and $^{12}C$ in a T centre, namely: $^{12}C$-$^{12}C$, $^{12}C$-$^{13}C$, $^{13}C$-$^{12}C$, and $^{13}C$-$^{13}C$. Of these atomic constituents, the hydrogen and $^{13}C$ possess nuclear spins that hyperfine couple to the T centre electronic spin. The different T centre isotopic combinations result in different coupling strengths between the spins that may be used as broker quantum systems and the spins that may be used as client quantum systems. The present technology may be applied to broker-client systems based on any of these types of T centre, for example.

Some solid state systems include plural spins that may be used as broker quantum systems and/or client quantum systems. For example, the T centre in silicon includes several nuclear spins that may each be used as a client quantum system. Additionally, $^{29}$Si nuclear spins in the surrounding silicon lattice could be coupled to a T centre in silicon to provide one or more client quantum systems. NV centres in diamond may be coupled to a local $^{14}$N or $^{15}$N nuclear spin or plural nearby $^{13}$C nuclear spins that may each serve as a client quantum system.

The same interactions between broker quantum system 11 and client quantum system 12 that result in hyperfine splitting of the energy levels of broker quantum system 11 can also cause dephasing of the quantum state of client quantum system 12 as a result of changes in the quantum state of broker quantum system 11.

Suppose, for example, that it is desired to cause the quantum state of broker quantum system 11 to be entangled with the quantum state of an external quantum system by way of an optical network. There are a variety of known protocols that may be applied for entangling the quantum states of two quantum systems. Some of these protocols are probabilistic in nature (meaning that each attempt to entangle two quantum systems using such protocols has a certain probability of failure). Some example protocols for creating entanglement between quantum systems are described in Refs. [4], [5] and [12].

Many protocols for entangling two spaced-apart quantum systems are optically mediated. In such protocols, single photons that have quantum states related to quantum states of the two quantum systems to be entangled (e.g. photons emitted by quantum transitions in one or both of the quantum systems) may be transported via optical paths to locations where interactions with or among the one or more photons may take place.

Particularly if the optical paths are lossy any individual attempt to entangle the quantum systems may fail. The average number of attempts required to entangle the quantum systems will increase with the lossiness of the optical paths.

Some entanglement protocols are fundamentally probabilistic. Where such protocols are used, any individual entanglement attempt may fail with a probability that depends on details of the protocol.

Entanglement protocols generally involve several steps. When an entanglement attempt fails, the quantum states of the associated quantum systems may be unknown and it is necessary to reinitialize the quantum systems involved and start the process for creating the desired entangled state again.

It can be seen that each attempt at entangling broker quantum system 11 with an external quantum system can involve multiple steps in which the quantum state of broker quantum system 11 is altered. Each of these steps can contribute to dephasing of the quantum state of client quantum system 12 with the result that any information stored in the quantum state of client quantum system 12 will more quickly become randomized so that it is not possible to recover the stored information.

For broker-client systems that consist of always-on interactions such as hyperfine-coupled nuclear-electronic spin pairs, protocols that involve repeated entanglement attempts generate measurable dephasing of client quantum systems. This occurs because reinitialization processes such as optical spin polarization that are used to reset broker spins are typically stochastic in nature. As a result, during the reset process, the broker (e.g. electron) spin will spend an undetermined amount of time in an unknown spin state before asymptotically relaxing into the initialized state. Because the client (e.g. nuclear) spin is hyperfine coupled to the broker spin and the hyperfine interaction is an 'always-on' coupling, the energy levels of the client spin will vary depending on the quantum state of the broker spin. Because the time evolution of quantum states depends upon the energy (Hamiltonian) of the states the phase accumulated by the client spin state varies unpredictably with each reset of the broker quantum system. Over the course of many resets, the unknown accumulated phase creates a significant dephasing mechanism for the typically long-lived client quantum system.

Other non-unitary operations that manipulate quantum states of a broker quantum system (e.g. by applying optical signals to the broker quantum system) may also result in dephasing of the quantum state of an associated client quantum system.

Ref. [7] presents a model for client dephasing during broker reset. According to the model the fidelity of a client quantum system remaining after N stochastic resets of the corresponding broker quantum system can be written as:

$$F = \frac{1}{2} + \frac{1}{2^{N+1}} \left( 1 + e^{\frac{1}{2} T_{reset}^2 d\omega^2} \right)^2$$

where $\tau_{reset}$ is the characteristic time required to reset the broker quantum system and $d\omega$ is the change in energy the client quantum system experiences upon a flip of the spin of the broker quantum system. According to this model, dephasing of the client quantum system can be reduced by reducing the broker reset time or by reducing the change in client energy resulting from flips of the spin of the broker quantum system.

There are applications in which it is advantageous to use as client quantum systems spins that are relatively strongly coupled to a corresponding broker quantum system. In these systems, the change in client energy resulting from spin flips in the broker quantum system cannot be easily reduced in practice. Such spins are generally local to the corresponding broker quantum system. Quantum systems that are local to a broker quantum system are advantageous for use as clients because the presence of a suitable local quantum system can be guaranteed (e.g. where the broker and client are each a spin in a specific known physical structure such as a T centre). Also, where client and broker are each a spin of a known physical structure the broker-client coupling strength can be known in advance since the physical relationship between the client and broker quantum systems is determined by the geometry of the physical structure in which they are both located.

In some embodiments the present technology is applied to a client-broker system in which the client and broker are relatively strongly coupled. Here, 'relatively strongly coupled' means having an interaction strength of more than 1 MHz (i.e. an interaction energy E given by E=hν where h is Planck's constant (which has a value of approximately $6.626 \times 10^{-34}$ J·Hz$^{-1}$) and ν is a frequency. In this case, ν is at least 1 MHz.

One aspect of the present technology provides methods and apparatus for in effect selectively turning off the hyperfine interaction between a broker quantum system and an associated client quantum system. These methods and apparatus may be applied to effectively reduce or suppress the effect of the hyperfine interactions on one or more client quantum systems during resets of the broker quantum system, thereby reducing or eliminating dephasing of the quantum state of the client qubit which would normally result from the resetting of the broker quantum system. The hyperfine interaction may be "on" at other times. For example, when the hyperfine interaction is being applied to drive two qubit gates between the client and the broker quantum systems.

A method for suppressing the hyperfine interaction between a client quantum system and a broker quantum system uses a resonant microwave magnetic field, which may be called a "dressing field", to continuously drive the broker quantum system during the broker reset process. The dressing field is configured to decouple the broker quantum system from the client quantum systems. The dressing field can be turned off when it is not needed.

The dressing field is oriented perpendicular to the Bz applied magnetic field in the "z" direction that is persistently applied during operation.

The dressing field comprises a Bx oscillating magnetic field that adds an additional term to the Hamiltonian ($H_{bc}$) for the broker-client system which describes the dynamics of the broker-client system.

The magnitude of Bz is selected to be sufficient to resolve the broker quantum system spin states to an extent required by the circumstances. The magnetic field Bz is typically much larger than Bx (e.g. by a factor in the range of 5 to 50,000 or more). Typical values of Bz are in the range 500 to 20,000 Gauss. Typical values of Bx are in the range 0.5 to 100 Gauss.

Where the hyperfine coupling of the broker and client includes only secular components (i.e. components that scale with Sz. Iz) then values for Bz may be lower than for cases where the hyperfine coupling includes nonsecular components (i.e. components that scale with Sx, Ix, Sy, and/or Iy) where Sx, Sy and Sz (Ix, Iy, and Iz) are respectively x, y and z components of the broker (client) spin angular momentum. Higher values for Bz are desirable when the hyperfine coupling includes non-negligible nonsecular components. When the hyperfine coupling includes non-negligible nonsecular components, the value of Bz can be chosen such that the Zeeman splitting of the client and broker spin states dominates over the nonsecular components of the hyperfine coupling and those nonsecular components can thus be neglected.

The Hamiltonian determines: which states of the broker-client system are stable (these states correspond to eigenvectors of the Hamiltonian), what the energies of the stable states are (the eigenvalues corresponding to the eigenvectors for the stable states), and how these eigenstates coherently evolve in time.

The dressing field can be designed so that the additional term in the Hamiltonian changes the dynamics of the broker-client system in such a way that the stable states of the broker spin (the broker spin eigenstates) lie in the x,y plane of the $S_z$ Bloch sphere instead of on the z-axis of the Bloch sphere.

In some embodiments the dressing field changes the dynamics of the broker such that when the dressing field is being applied the basis states of the broker-client system (i.e. eigenvectors of the Hamiltonian) involve superpositions of the broker states |↑> and |↓>) so that the energy levels of the client in the basis states of the client broker system are independent of the state of the broker. For example, in each basis state of the client-broker system the broker may have one of the quantum states |+> or |-> (where |+> represents the broker state $$\frac{1}{\sqrt{2}}(|\uparrow > + | \downarrow >)$$

and |-> represents the broker state $$\frac{1}{\sqrt{2}}(|\uparrow > - | \downarrow >)).$$

These states each involve equal weights $$(1/\sqrt{2})$$

of |↓> and |↑> and therefore have the identical effect on the energy levels of the client.

When the spin energy splitting from Bz, the static applied magnetic field in the z-direction, is much larger than the strength of the hyperfine coupling, the Hamiltonian can be simplified under the secular approximation. Under this approximation, the hyperfine interaction reduces to include only the component $A_z$ that enters as $S_z \otimes I_z$ where $S_z(I_z)$ is the electronic (nuclear) Pauli spin matrix. In this case, whenever the strength of the dressing field is much larger (e.g. 10× or more) than $A_z$ the change to the dynamics caused by the dressing field results in client energy states that are unaffected by the state of the broker. This means that in the dressed state basis, the client will not accumulate an unknown phase due to broker spin flips.

While the inventors do not intend to be bound by any particular theory of operation, one way to explain this result is that, in the presence of the dressing field the stable broker quantum states become equally weighted superpositions of ↑ and ↓. By contrast, the stable quantum states of the client remain aligned with Z. Therefore switching between the stable broker states does not affect energies of the client states.

Consider a broker-client system with a single client quantum system like that shown in FIG. 1. The spin Hamiltonian for the broker-client system in the secular approximation in the high-field limit ($\gamma_n B_z >> |A|$ where $>>$ is 10× or more), can be written as follows:

$$H_{bc} = \gamma_b S_z B_z + \gamma_c I_z B_z + \gamma_b S_x B_x + A_z S_z I_z \tag{1}$$

where $\gamma_b$ ($\gamma_c$) is the broker (client) gyromagnetic ratio, S (I) is the broker (client) Pauli vector, B is an external magnetic field, and A is the hyperfine coupling between the client and the broker. For the typical case where the broker is an electron spin and the client quantum system is a nuclear spin $\gamma_b$ ($\gamma_c$) are respectively the gyromagnetic ratios for the electron and the nuclear spin and S (I) is the electron (nuclear) Pauli vector.

Equation (1) omits the term $\gamma_c I_x B_x$ that represents a nuclear magnetic resonance (NMR) drive of the client quantum system (nuclear spin). This is reasonable since in this case $B_x$ is the dressing field for the broker quantum system (electron spin) which will generally be highly detuned from the NMR resonance.

The method involves applying a continuous microwave drive signal given by:

$$B_x = \Omega \cos[(\gamma_b B_z + \Delta)t] \qquad (2)$$

The frequency of $B_x$ is equal to the broker spin Zeeman splitting $\gamma_b B_z$ plus a detuning value, $\Delta$, which can be zero, positive or negative. $\Delta$ is much smaller than the strength of the dressing field $\Omega$ (i.e. at least 10× smaller than the dressing field).

Transforming the Hamiltonian of Equation (1) into the rotating frame and making the rotating wave approximation, yields the following Hamiltonian in the $\{\uparrow\Uparrow; \uparrow\Downarrow; \downarrow\Uparrow; \downarrow\Downarrow\}$ basis (where single arrows $\uparrow$ represent broker spin and double arrows $\Uparrow$ represent client spin):

$$H_{rwa} = \begin{pmatrix} \frac{1}{2}(A_z + \gamma_c B_z + \Delta) & 0 & \frac{\Omega}{2} & 0 \\ 0 & -\frac{1}{2}(A_z + \gamma_c B_z - \Delta) & 0 & \frac{\Omega}{2} \\ \frac{\Omega}{2} & 0 & -\frac{1}{2}(A_z - \gamma_c B_z + \Delta) & 0 \\ 0 & \frac{\Omega}{2} & 0 & \frac{1}{2}(A_z - \gamma_c B_z - \Delta) \end{pmatrix}$$

Diagonalizing $H_{rwa}$ yields the eigenstates and energies of the hyperfine-coupled dressed broker basis. The dressed Hamiltonian can then be written in the basis $\{\Downarrow-, \Downarrow+, \Uparrow-, \Uparrow+\}$ (where + represents the state $$\frac{1}{\sqrt{2}}(|\uparrow> + |\downarrow>)$$

of the broker quantum system and − represents the state $$\frac{1}{\sqrt{2}}(|\uparrow> - |\downarrow>)$$

of the broker quantum system) as:

$$H_d = \begin{pmatrix} -\frac{1}{2}\left(\sqrt{(A_z - \Delta)^2 + \Omega^2} + \gamma_c B_z\right) & 0 & 0 & 0 \\ 0 & \frac{1}{2}\left(\sqrt{(A_z - \Delta)^2 + \Omega^2} - \gamma_c B_z\right) & 0 & 0 \\ 0 & 0 & -\frac{1}{2}\left(\sqrt{(A_z + \Delta)^2 + \Omega^2} - \gamma_c B_z\right) & 0 \\ 0 & 0 & 0 & \frac{1}{2}\left(\sqrt{(A_z + \Delta)^2 + \Omega^2} - \gamma_c B_z\right) \end{pmatrix}$$

For a given broker state, the rate that the client quantum system accumulates phase is given by the energy difference between the $\Uparrow$ and $\Downarrow$ states. From the Hamiltonian above, we see that for a resonant dressing field ($\Delta=0$) this energy difference is equal to $\gamma_c B_z$ for both broker eigenstates, making the change in the rate of phase accumulation ($d\omega$) for quantum states of the client quantum system equal to zero.

Introducing a dressing field that resonantly drives the broker quantum system, changes the 'good' eigenstates of the broker spin from the $S_z$ eigenstates to the dressed $S_x$ eigenstates. These eigenstates have suppressed sensitivity to interactions that enter the Hamiltonian through an $S_z$ term. When the large Bz value places the system in the secular regime, the hyperfine coupling between the broker and client spins enters through the $S_z$ term and is suppressed by the dressing field. The dressing field may thus be applied to effectively turn off the hyperfine interaction and decouple the client spin from the broker.

To make use of the above technique for making the client quantum system insensitive to the state of the broker quantum system during a reset or other manipulation of the quantum state of the broker quantum system, one must have a way to make the desired manipulation of the quantum state of the broker quantum system while the broker quantum system is operating in the "dressed" basis. To facilitate this, there should be optically resolvable splitting between the dressed states (e.g. the set of broker states $\{+, -\}$).

The splitting between the dressed broker states can be made optically resolvable by making the amplitude $\Omega$ of the dressing field sufficiently large that the energy difference between the dressed broker states corresponds (i.e. according to the relationship E=hν) to a frequency that is significantly larger than the linewidth of optical transitions used to manipulate the quantum state of the broker quantum system. Here "significantly larger" means at least 4 or 5 times larger. Spin driving strengths sufficient to provide a splitting of ~1 GHz have been demonstrated in solid state spin-photon interfaces [11]. Various physical quantum systems that may be used for a broker quantum system have transition linewidths small enough that broker spin dressing fields with strengths sufficient to yield splitting between the broker dressed states + and − in the range of 10-100 MHz are sufficient to make the transitions optically resolvable.

For example, T centres in silicon can have transition linewidths small enough that the transitions can be optically resolved with energy splitting between dressed basis states of 100 MHz or less. In T centres in silicon, the optical linewidth is a function of temperature of the T-centres, the spectral diffusion experienced by the T centres, any power broadening from large optical drives, and the lifetime of the optical excited state. The thermal contribution can be made negligible by operating in a cryostat at cryogenic temperatures (e.g. temperatures below 2K). Spectral diffusion for T centres has been demonstrated to be <10 MHz in bulk samples. Power broadening can be limited at the cost of increasing the reset time, $\tau_{reset}$, by using optical pumping fields having intensities below a threshold selected to limit the power broadening so that the optical linewidth of the transitions is low enough for the splitting provided by a particular dressing field strength. The lifetime linewidth contribution of T centres in bulk silicon is 169 kHz.

Figure 3:
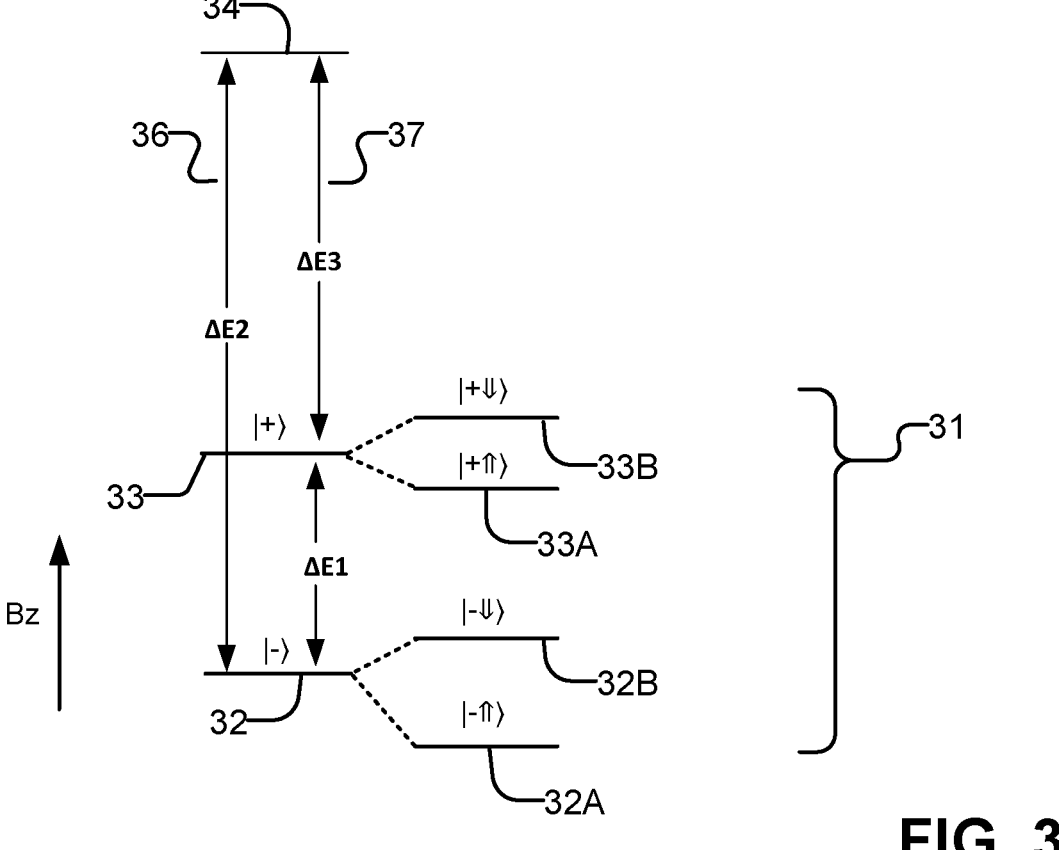
FIG. 3 is a schematic energy level diagram that illustrates energy levels associated with quantum states of an example broker quantum system in the presence of a dressing field.

One can selectively initialize a broker spin into one of two spin states by optical pumping with light having a frequency that corresponds to a selected one of a plurality of transitions from the ground state level to an excited state. FIG. 3 is a schematic energy level diagram that illustrates energy levels associated with quantum states of an example broker quantum system 11 in the presence of a dressing field. A ground state 21 is split into two levels 32 and 33. Level 32 corresponds to quantum system 11 being in the state |+>. Level 33 corresponds to quantum system 11 being in the state |->. Levels 32 and 33 are separated by an energy difference ΔE1 which depends on the value of Ω (the magnitude of the dressing field) as well as the hyperfine constant Az.

Broker quantum system 11 has an excited state having an energy level 34. Transitions 36 and 37 to excited state 34 from levels 32 and 33 require energies ΔE2 and ΔE3 respectively.

Broker quantum system 11 may be reset, for example to state 33 by applying an optical pumping field having a frequency corresponding to energy ΔE2. With this optical pumping field, if broker quantum system 11 is already in state 33 it will stay in state 33 (because ΔE2 is not the correct amount of energy for transition 37). If broker quantum system 11 is initially in state 32 then it will be excited to excited state 34 by the optical pumping and will subsequently decay to state 32 or 33 (the relative probabilities of decay from excited state 34 to states 32 and 33 is determined by a branching ratio for the decay). Given enough time, as long as the transition from excited state 34 to state 33 is not prohibited for any reason, with a high probability, broker quantum system 11 will be reset to state 33.

Figure 4:
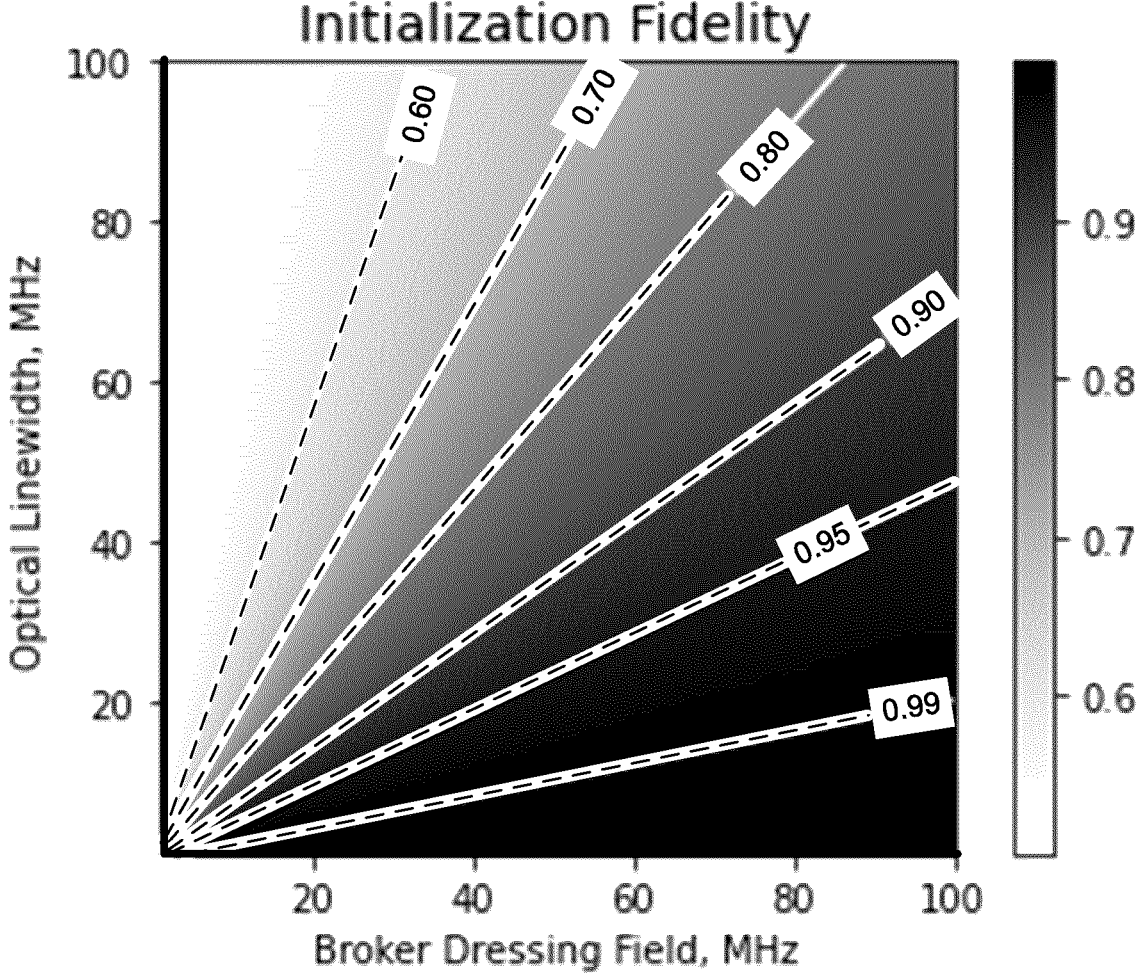
FIG. 4 is a contour plot that illustrates the effect of dressing field strength and optical linewidth on initialization fidelity for a broker qubit.

FIG. 4 is a plot that shows results of a simulation of initialization fidelities obtained by optically pumping a broker quantum system within the dressed broker basis as a function of both optical linewidth of the pumped transition and the broker dressing field strength. This simulation demonstrates that high fidelity initialization can be achieved with this strategy. For example, 99% initialization fidelity can be achieved if the broker dressing field is ~5× larger than the optical linewidth.

By changing the way in which the dressing field is turned off the procedure described above for resetting a broker quantum system may be selectively used to leave the broker quantum system in an eigenstate of the dressed basis (e.g. in the state |+>) or in an eigenstate of the undressed basis (e.g. the state |↑>). This is illustrated in FIGS. 5A and 5B.

Figure 5A:
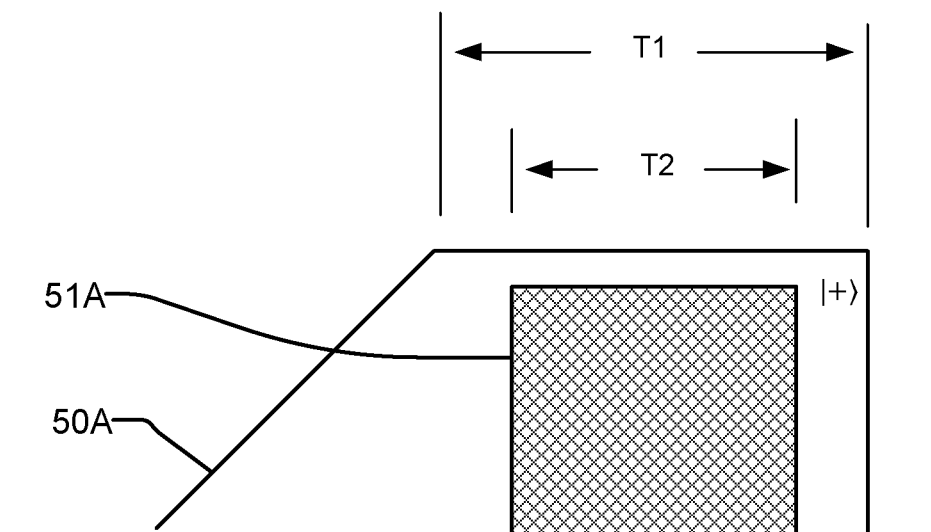
FIGS. 5A and 5B are plots showing example waveforms for the magnitude of a dressing field as a function of time in relation to a period of optical pumping.

In FIG. 5A, curve 50A shows the magnitude of the dressing field as a function of time. The dressing field is applied with a magnitude Ω and held at magnitude Ω for a period T1. The way in which the dressing field is applied (e.g. whether the dressing field is increased relatively slowly over time or brought quickly to magnitude Ω is not critical as the quantum state is initially unknown. Turning on of the dressing field can be abrupt or gradual.

Curve 51A shows application of optical pumping for a period T2. T2 is chosen to be long enough that, at the end of period T2 the broker quantum system is, with a high probability, in a selected eigenstate of the dressed basis (e.g. in the state |+>). The dressing field is then discontinued non-adiabatically to leave the broker quantum system in the |+⟩ state. To provide a non-adiabatic departure from the dressed basis the dressing field may be reduced rapidly. To achieve a sufficiently non-adiabatic departure from the dressed basis, the dressing field is reduced to zero at a rate that is much larger than the dressing field strength Ω. For example, the time over which the dressing field is reduced from magnitude Ω to near zero may be less than or equal to $(10\Omega)^{-1}$ or less than $(100\Omega)^{-1}$ or less than $(1000\Omega)^{-1}$ (where Ω is expressed in frequency units using the expression $v=\gamma B$ where γ is the gyromagnetic ratio for the broker spin, B is the magnitude of the dressing field in Tesla and v is the frequency).

Figure 5B:
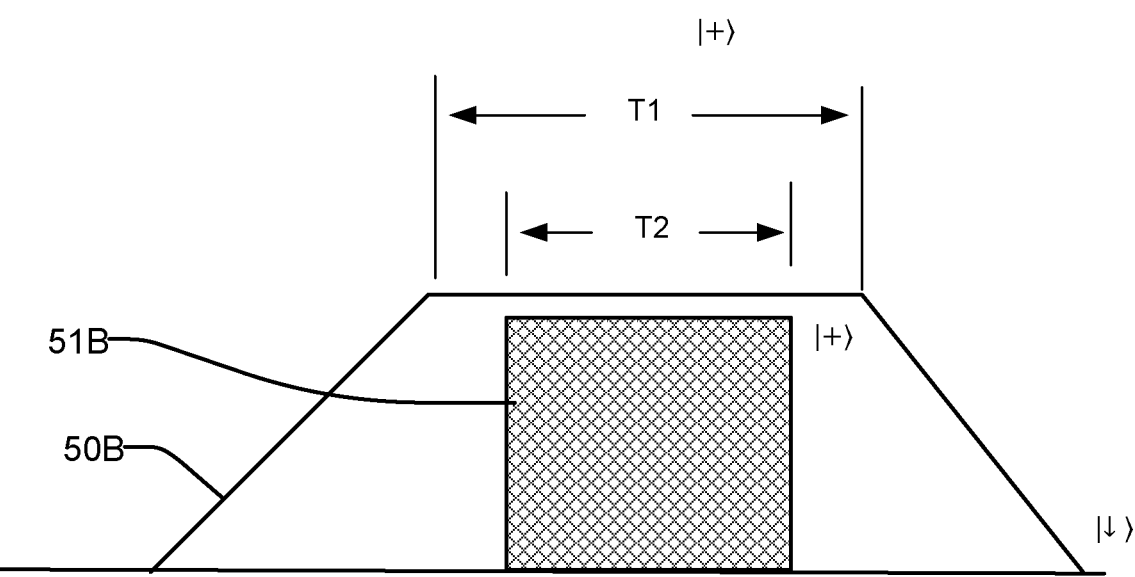

In FIG. 5B, curve 50B shows the magnitude of the dressing field as a function of time. The dressing field is increased to a magnitude Ω and held at magnitude Ω for a period T1. As above, the rate at which the dressing field is increased to the magnitude Ω is not critical. The strength of the dressing field may be increased linearly or non-linearly. Curve 51B shows application of optical pumping for a period T2. T2 is chosen to be long enough that, at the end of period T2 the broker quantum system is, with a high probability in a selected eigenstate of the dressed basis (e.g. in the state |+>). The dressing field is then discontinued to provide an adiabatic departure from the dressed basis (e.g. by reducing the dressing field 50B down adiabatically). Adiabatic reduction of the dressing field may be achieved by reducing the magnitude of the dressing field at a rate that is much slower than a period corresponding to the dressing field strength Ω. For example, the dressing field may be reduced at a rate such that a total time to leave the dressed basis is much greater than 1/Ω where Ω is specified in frequency units as above. Here, "much greater" means at least greater by 5× to 100× or more.

The adiabatic reduction of the dressing field causes the |+⟩, |-⟩ eigenstates of the dressed broker quantum system to transition to the undressed |↓⟩, |↓⟩ $S_z$ eigenstates.

For example, the techniques above could be applied to reset broker quantum systems for attempting entanglement protocols like those set out in Refs. [4] and [5]. For the protocol outlined in Ref [4], the Hadamard gate at the start of the protocol is replaced by a non-adiabatic departure from the dressed basis that leaves the broker spin in the |+⟩ state (e.g. as in FIG. 6A). The protocol outlined in Ref. [5] requires the broker spin to be initialized into an eigenstate of the undressed basis so an adiabatic departure from the dressed basis may be performed (e.g. as in FIG. 6B).

Purcell Enhancement

As discussed above, one factor that affects the linewidth of an optical transition is the lifetime of the excited state. Shorter lifetimes of the excited state result in increases in the optical linewidth of a transition. In some embodiments the broker quantum system is optically coupled to a waveguide or other optical system by way of an optical resonator (e.g. a photonic cavity) that has a resonance that corresponds to photons emitted as a result of a quantum transition in the broker quantum system. For example, such an optical resonator may be provided where a broker quantum system is part of a spin-photon interface.

The presence of an optical resonator can cause a significant increase in the rate of spontaneous emission of a photon by the broker quantum system as a result of the Purcell effect. For example, an optical cavity may achieve Purcell enhancements as high as ~1000× or more. These Purcell enhancements can significantly shorten the lifetime of the excited state of the broker quantum system and thereby cause a significant increase in the "lifetime" component of the optical linewidth of the associated transition. For example, where a T centre is in or otherwise strongly coupled to an optical cavity that is resonant with a transition of an unpaired electron of the T centre Purcell enhancements can broaden the lifetime linewidth of optical transitions resonant with the cavity to ~200 MHz. In some cases this linewidth may be too high for practical magnitudes of the dressing field.

There are at least two approaches to avoid broadening of the lifetime linewidth of a transition that is used in resetting a broker quantum system. These approaches may be applied individually or combined. A first approach is to temporarily tune the optical resonator and/or the broker quantum system such that the frequency (or equivalently wavelength) of photons emitted by the broker quantum system during a reset of the broker quantum system do not coincide with a resonance of the optical resonator. A second approach is to use different transitions for resetting the broker quantum system and for other operations (e.g. attempting to entangle the broker quantum system with another quantum system).

An example of the first approach is that an electric field may be applied to the broker quantum system (e.g. by applying a potential difference between electrodes on either side of the broker quantum system). Application of the electric field causes a shift in energy levels of the broker quantum system by the Stark effect. This shift in energy levels can cause corresponding shifts in the wavelengths of photons emitted as a result of quantum transitions of the broker quantum system). While the broker quantum system is being reset the applied electric field may be adjusted (e.g. increased, decreased, turned off or turned on) so that the wavelengths of photons emitted by the broker quantum system during the reset operation are not resonant with an optical resonator. After the reset has been completed, the electric field may be again adjusted (e.g. increased, decreased, turned off or turned on) so that the wavelengths of photons emitted by the broker quantum system are resonant with the optical resonator.

Figure 6A:
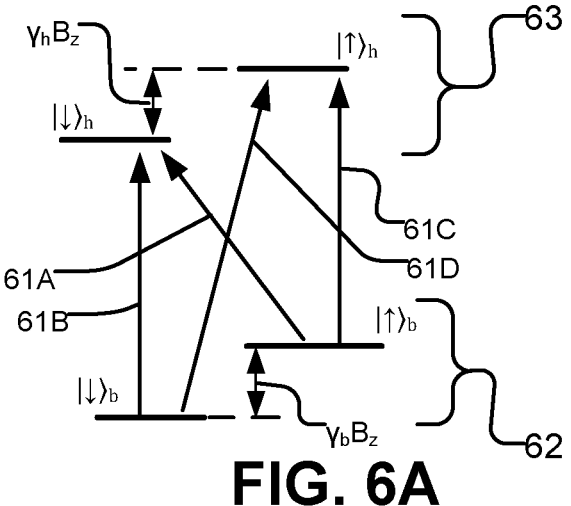
FIG. 6A is an example energy level diagram for a broker quantum system that has four optical transitions between its ground state and an excited state.
Figure 6B:
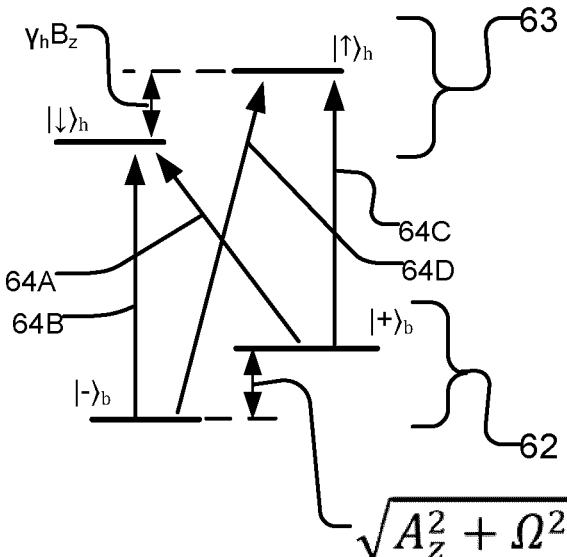
FIG. 6B is an example energy level diagram for the broker quantum system of FIG. 6A in the presence of a dressing field.

FIGS. 6A and 6B are energy level diagrams that illustrate the second approach. FIG. 6A shows the example of a broker quantum system that has four optical transitions 61A, 61B, 61C and 61D (collectively or generally transitions 61) between its ground state 62 and excited state 63. An example of a physical quantum system that has this pattern of transitions is a T centre in silicon. In the second approach, a first one of transitions 61 corresponds to photon energies that are resonant with an optical resonator coupled to the broker system. The first transition 61 may, for example be used to emit photons as required by an entanglement protocol. A second one of transitions 61 may be used for resetting the broker quantum system. The second transition 61 may correspond to photon energies that are far enough away from being resonant with the optical resonator that there is little Purcell enhancement of the second transition. Consequently the second transition 61 can have a much narrower optical line width than the first transition 61.

Some entanglement protocols require the use of spin-conserving transitions. In FIG. 6A, transitions 61B and 61C are spin conserving. In some embodiments one of transitions 61B and 61C is used to generate photons for entanglement attempts and the other one of transitions 61B and 61C is used for optical pumping to reset the broker quantum system.

Figure 6C:
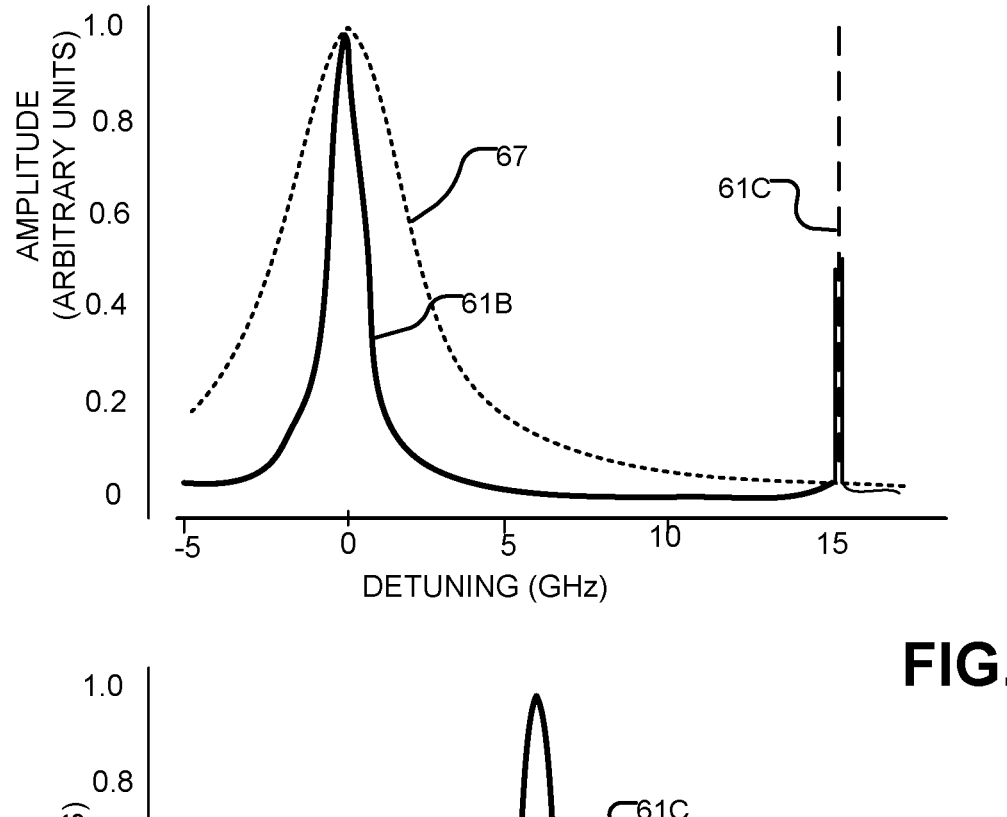
FIG. 6C is a schematic graph illustrating linewidths for two optical transitions and the frequency response of an optical resonator (e.g. cavity).

FIG. 6C shows the case where optical transition 61B is tuned near resonance with an optical cavity (and therefore has an increased linewidth due to Purcell enhancement). Transition 61C is Zeeman split several GHz away and consequently can have a much lower Purcell enhancement and a much narrower lifetime linewidth than transition 61B.

Figure 6D:
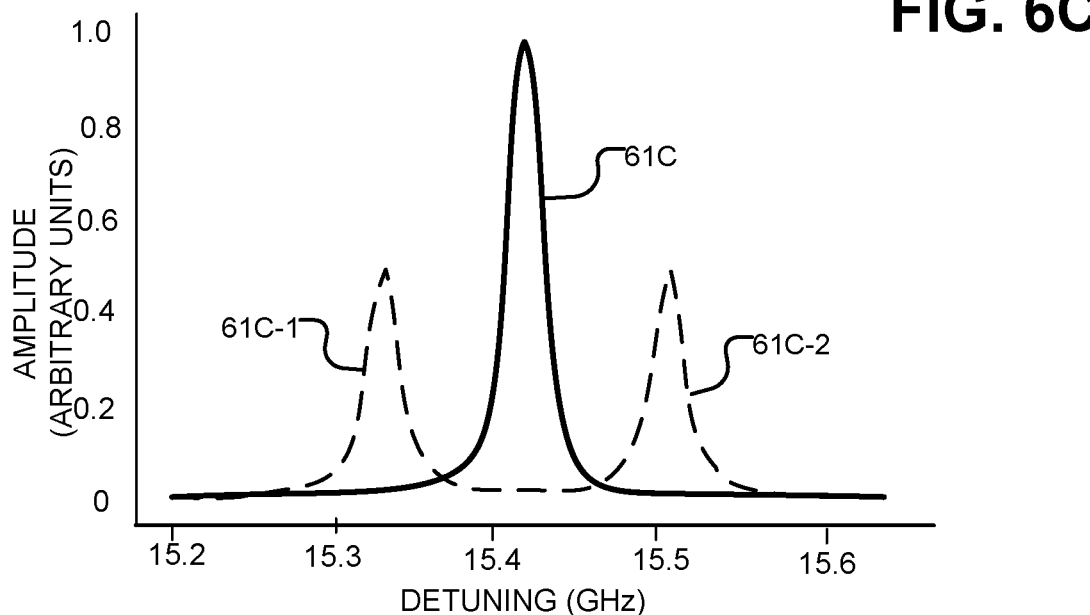
FIG. 6D is a graph showing splitting of a spectral peak corresponding to a transition into two subpeaks as a result of application of a dressing field.

When a dressing field is applied to the broker quantum system as described elsewhere herein, the available levels in the ground state correspond to |+⟩ and |−⟩ instead of |↑⟩ and |↓⟩. Consequently the available transitions from ground state 62 to excited state 63 become 64A, 64B, 64C and 64D (generally and collectively transitions 64). Transitions 64 correspond to energy differences that are different from those of transitions 61A to 61D. In particular, as shown in FIG. 6D, a spectral peak corresponding to transition 61C is effectively split into two subpeaks 61C-1 and 61C-2 corresponding to transitions from the |+⟩ and |−⟩ dressed states.

It is therefore possible to attempt entanglement using optical transition 61B and, if the attempted entanglement fails, apply the dressing field to dress the broker quantum system, with the broker quantum system in the dressed state, reinitialize the dressed broker quantum transition by cycling the dressed optical transition 64C, which is well-detuned from the optical resonator; and then return the broker quantum system to the undressed ("bare") condition by turning off the dressing field. In FIG. 6C the response of the optical resonator is indicated by dashed line 67.

Plural Client Quantum Systems

Figure 7:
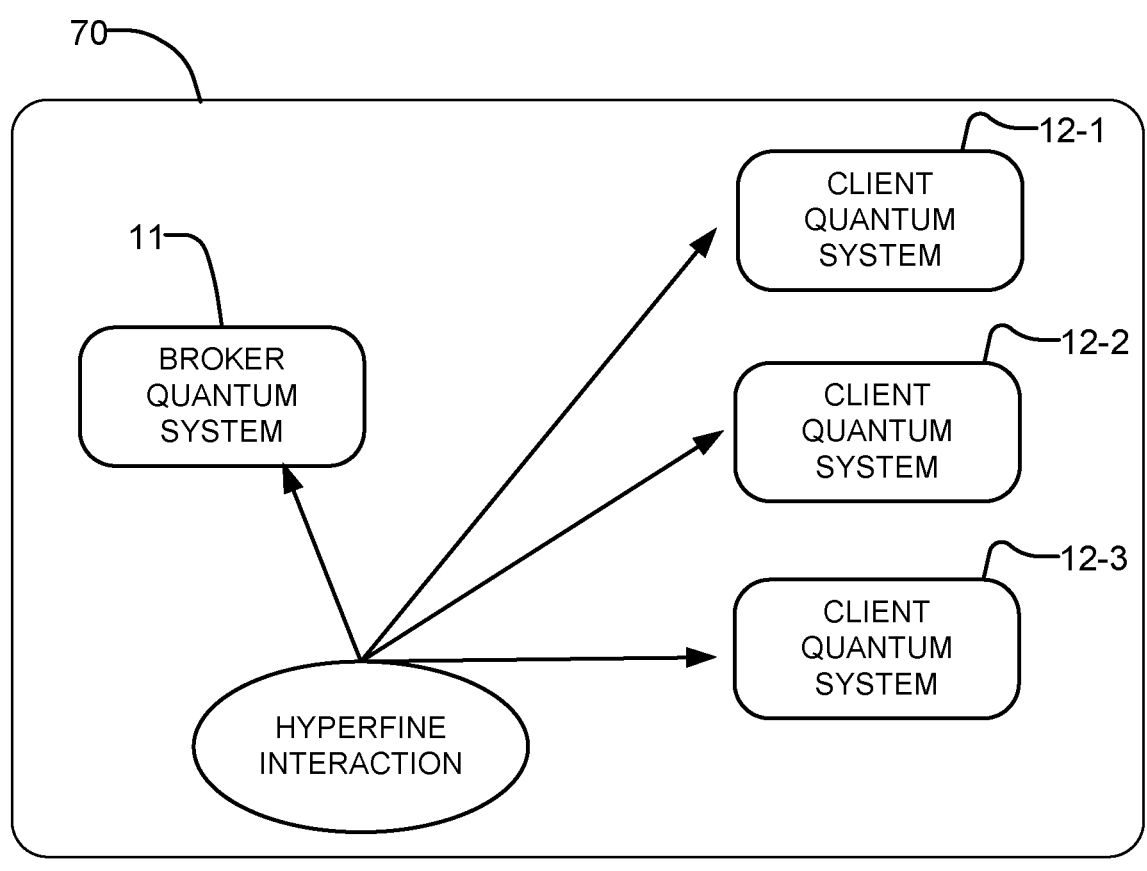
FIG. 7 is a schematic drawing illustrating a quantum system that includes a broker element and a plurality of client elements.

In some applications plural client quantum systems may be associated with the same broker quantum system. This is illustrated in FIG. 7 which shows a luminescent centre 70 that includes one broker quantum system 11 (e.g. an electron spin) associated with three local client quantum systems 12 (identified individually as 12-1, 12-2 and 12-3). The client quantum systems may each be a nuclear spin. For example, a T centre may include one or two $^{13}$C nuclear spins as well as one hydrogen nuclear spin that may be each applied as a client quantum system.

Following the same procedure as above and once again working in the high-field limit, if plural client quantum systems are present, only one of them can achieve the ideal protection condition of dω=0 when a single dressing field is present because, in general, each of the client quantum systems will have a different value for $\gamma_c B_z$.

The relative protection of each client quantum system may be tuned by adjusting the value of Δ, the microwave detuning from resonance, or by adding additional dressing fields. The rate of optical pumping of the broker quantum system may also be set to be balanced with the attainable dressing fields to optimize the protection of all client quantum systems. These approaches may be used to protect two or more associated client quantum systems that have hyperfine couplings to the associated broker quantum system that are comparable in magnitude. This approach can reduce undesired evolution of the quantum states of plural client quantum systems.

Example Method

Figure 8:
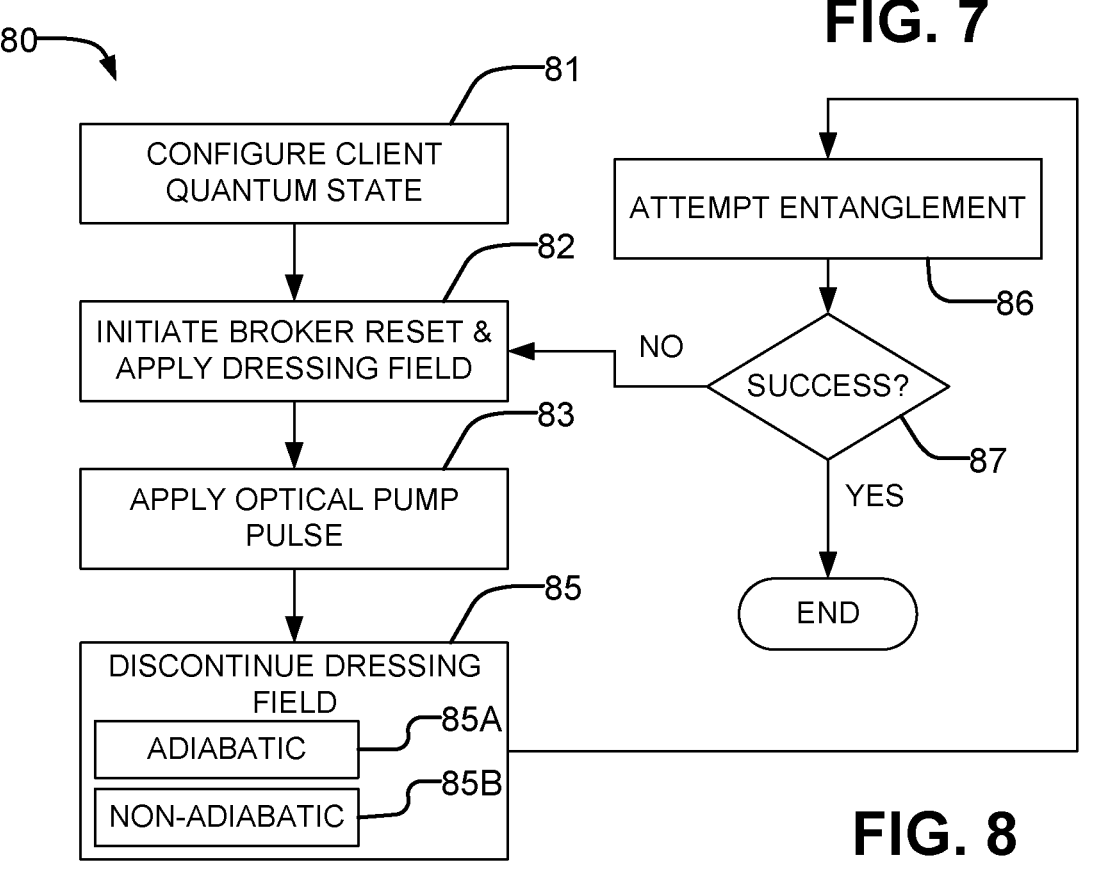
FIG. 8 is a flowchart illustrating a method according to an example embodiment of the present technology.

FIG. 8 is a flowchart illustrating a method 80 according to an example embodiment. In block 81 a client quantum system is configured in a quantum state that represents information. Block 81 may, for example, comprise any of:

teleporting a quantum state to the client quantum system; applying a quantum gate to the client quantum system; manipulating the quantum state of the client quantum system using optical and/or radiofrequency pulses; entangling the quantum state of the client quantum system with some other quantum system etc.

In block 82 it is decided to reset a broker quantum system associated with the client quantum system. Block 82 may, for example, comprise detecting that an attempt at entangling the broker quantum system with another quantum system has failed. In response the dressing field is applied to the client-broker system made up of the client quantum system and the associated broker quantum system. The frequency of the dressing field is selected according to Eqn. (2). The magnitude, Ω, of the dressing field is selected as described above.

In block 83 an optical pulse is delivered to the broker quantum system. The frequency (or equivalently wavelength) of the optical pulse is selected to correspond to the energy required for an optical transition from one dressed basis state of the broker quantum system to an excited state of the broker quantum system. A duration of the optical pulse may be selected so that given the intensity of the optical pulse and the lifetime of the excited state of the broker quantum system the likelihood that the broker quantum system will be in a particular one of the dressed basis states at the end of the optical pulse is at least a threshold probability (e.g. a threshold probability in the range of 70% to 100%).

In block 85 the dressing field is discontinued. Block 85 can include a non-adiabatic reduction of the dressing field (block 85A) or an adiabatic reduction of the dressing field (block 85B).

In block 86 an attempt is made to entangle the quantum state of the broker quantum system with another quantum system. If the entanglement attempt fails (NO result in block 87 then method 80 loops back to block 82. If the entanglement attempt is successful (YES result in block 87) then method 80 ends.

The entanglement of the broker quantum system may optionally be applied for operations such as teleporting the quantum state of the associated client quantum system to another location, teleporting a quantum gate to act on the associated client quantum system etc.

Example Apparatus

Figure 9:
FIG. 9 is a block and schematic diagram illustrating apparatus according to an example embodiment of the present technology.

FIG. 9 shows apparatus 90 according to an example embodiment. Apparatus 90 includes a crystalline substrate 94. Substrate 94 may, for example, comprise diamond, silicon, gallium arsenide or silicon carbide. A broker quantum system 91 and at least one client quantum system 92 that is local to broker quantum system 91 (collectively broker-client system 93) are located in or on substrate 94. Broker quantum system 91 and client quantum system 92 may, for example be respectively provided by an electron spin and a nuclear spin of a colour centre or luminescent centre in substrate 94.

Apparatus 90 includes an integrated optical layer 95 on substrate 94 that includes an optical resonator 95A that is coupled to broker-client system 93 and a waveguide 95B that is operative to optically connect optical resonator 95A to other optical apparatus.

Apparatus 90 includes systems for setting operating conditions for broker-client system 93. In system 90 these include: a cryogenic refrigerator 96, a magnet 97 operable to provide a static magnetic field Bz, a light source 98 operable to deliver light having a wavelength selected for optical pumping of broker quantum system 91, a RF (radiofrequency) source 99 operable to provide a dressing field at broker-client system 93, an electric field source 100 operable to provide an electric field at broker-client system 93, A control system 101 is connected to control operation of apparatus 90. The control system 101 may alternatively be referred to as a controller. Control system 101 may, for example, be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these.

Examples of specifically designed hardware are: logic circuits, application-specific integrated circuits ("ASICs"), large scale integrated circuits ("LSIs"), very large scale integrated circuits ("VLSIs"), and the like.

Examples of configurable hardware are: one or more programmable logic devices such as programmable array logic ("PALs"), programmable logic arrays ("PLAs"), and field programmable gate arrays ("FPGAs").

Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Control system 101 may be an integrated system or may comprise separate units that operate independently and/or in coordination to control operation of apparatus 90.

Control system 101 is connected to receive inputs from sensors 102 that monitor operation of system 90. Sensors 102 may, for example comprise Bell state analyzers and/or single photon detectors that detect heralded entanglement of broker 91 and/or conditions that indicate that broker 91 should be reset, sensors that provide feedback regarding conditions such as the temperature of substrate 94, magnetic and/or electrical field strengths near broker-client system 93 etc. Sensors 102 may include time tagging hardware that is operative to precisely determine times of events (e.g. photon detection events).

For example, control system 101 may be configured to control apparatus 90 to reset broker quantum system 91 by coordinating a sequence of operations that includes: controlling RF source 99 to apply the dressing field to broker-client system 93; while the dressing field is being applied, controlling light source 98 to deliver a pulse of light selected to optically pump broker quantum system 91; after delivery of the pulse of light turn off the dressing field. Optionally control system 101 is further configured to control electric field source 100 to apply an electric field to broker-client system 93 during the reset process. In some embodiments this sequence of operations is triggered automatically by controller 101 (e.g. in response to detecting that an attempt to entangle broker 91 with another system has not been successful).

Controller 101 may store parameters for these operations. The parameters may, for example, include some or all of: magnitude Ω of the dressing field, frequency of the dressing field, duration for maintaining the dressing field, waveform for the dressing field (e.g. specifications for how the dressing field is ramped up and/or ramped down), frequency of the pulse of light, duration of the pulse of light, and/or electric field strength for the reset procedure.

In some embodiments, broker-client system includes plural client quantum systems 92 and controller 101 is configured to selectively set parameters for the dressing field to protect the quantum state of a selected one of the client quantum systems or to set parameters of the dressing field to optimally protect the quantum states of two or more of the client quantum systems.

Example Applications

An example application of the present technology is to facilitate using spin-photon interfaces as nodes in a quantum network. Such a network may be configured, for example as a distributed quantum computer and/or a quantum communication system. Spin-photon interfaces built on solid state colour centres such as the SiV or NV centres in diamond or the T centre in silicon can be photonically-linked by her-alded, emission-based entanglement protocols to construct such quantum networks (see Refs. [1-5]).

In cases where a quantum memory such as a coupled nuclear spin is available to the spin-photon interface, broker-client entanglement protocols can be used to facilitate link-ing multiple nodes on the quantum network [6]. In broker-client entanglement protocols, entanglement is generated between two broker qubits (typically electron spins) using protocols such as those described in Refs. [4,5]. The two-qubit entangled state can then be stored in the quantum memory of the nuclear spin (the client), freeing up the broker spin to generate entanglement with another broker on the quantum network. In this way, multi-node quantum networks can be constructed [2,3].

Because many emission-based entanglement schemes are probabilistic in nature, a broker-client protocol also provides a layer of protection against the inevitable occurrence of failed entanglement attempts. Without a client storing the networked quantum state, a failed entanglement attempt would collapse a pair of brokers into an unknown quantum state, removing those qubits from the networked state. By storing the networked state in client qubits, however, failed broker entanglement attempts can be redressed by simply resetting the broker qubits after each failure until a success-ful entanglement attempt is heralded. In this way, even with low probabilities of successful entanglement, multi-node quantum states can be constructed on the quantum network.

The technology described herein may be applied, for example, to protect the quantum information stored in nuclear spins from dephasing as a result of steps taken to reset associated broker quantum systems (e.g. electron spins).

Where a component (e.g. a software module, processor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodi-ments of the invention.

The present technology may also be provided in the form of a program product. The program product may comprise any non-transitory medium which carries a set of computer-readable instructions which, when executed by a data pro-cessor, cause the data processor to execute a method of the invention. For example, the data processor may be a data processor of a control system and the computer-readable instructions may cause the control system to execute a method as described herein (e.g. a method for resetting a broker quantum system). Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMS, hardwired or pre-programmed chips (e.g., EEPROM semiconductor chips), nanotechnology memory, or the like. The computer-readable signals on the program product may optionally be com-pressed or encrypted.

Interpretation of Terms

Unless the context clearly requires otherwise, throughout the description and the claims:

"comprise", "comprising", and the like are to be con-strued in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or con-nection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value ±10%;

where a feature is described as being "optional" or "optionally" present or described as being present "in some embodiments" it is intended that the present disclosure encompasses embodiments where that fea-ture is present and other embodiments where that feature is not necessarily present and other embodi-ments where that feature is excluded. Further, where any combination of features is described in this appli-cation this statement is intended to serve as antecedent basis for the use of exclusive terminology such as "solely," "only" and the like in relation to the combi-nation of features as well as the use of "negative" limitation(s)" to exclude the presence of other features; and "first" and "second" are used for descriptive purposes and cannot be understood as indicating or implying relative importance or indicating the number of indicated tech-nical features.

Words that indicate directions such as "vertical", "trans-verse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;
in some embodiments the numerical value is in the range of 9.5 to 10.5;
and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for protecting a quantum state of a client quantum system of a broker-client system comprising the client quantum system and a broker quantum system coupled by a hyperfine interaction, the method comprising:

suppressing the hyperfine interaction by applying an electromagnetic dressing field to the client-broker system in the presence of a first magnetic field, the electromagnetic dressing field comprising a second magnetic field that oscillates in a direction perpendicular to the first magnetic field; and while the hyperfine interaction is suppressed, altering a quantum state of the broker quantum system by performing steps including optically exciting the broker quantum system, wherein:

the dressing field has a frequency and amplitude selected to cause eigenstates of the Hamiltonian of the broker-client system to change from a bare basis to a dressed basis wherein, in the dressed basis, energy levels of ground quantum states of the client quantum system are independent of energy levels of the broker quantum system.

2. The method according to claim 1 wherein altering the quantum state of the broker quantum system comprises resetting the quantum state of the broker quantum system to a predetermined initial quantum state.

3. The method according to claim 1 wherein the bare basis is made up of combinations of a pure state of the client quantum system and a pure state of the broker quantum system and the dressed basis is made up of combinations of pure states of the client quantum system and coherent superpositions of original pure states of the broker quantum system.

4. The method according to claim 1 wherein the dressed basis comprises the states $\{+\Uparrow; +\Downarrow; -\Uparrow; -\Downarrow\}$ where + represents the state $$\frac{1}{\sqrt{2}}(|\uparrow> +|\downarrow >)$$

or the broker quantum system, − represents the state $$\frac{1}{\sqrt{2}}(|\uparrow> +|\downarrow >)$$

of the broker quantum system, single arrows $\uparrow$ and $\downarrow$ represent spin of the broker quantum system in the direction of the first magnetic field and double arrows fr and I represent spin of the client quantum system in the direction of the first magnetic field.

5. The method according to claim 4 wherein the bare basis comprises the states $\{\uparrow\Uparrow; \uparrow\Downarrow; \downarrow\Uparrow; \downarrow\Downarrow\}$.

6. The method according to claim 5 wherein a frequency of the dressing field is equal to a broker spin splitting resulting from Zeeman spin splitting of the broker quantum system plus a detuning value.

7. The method according to claim 6 wherein the detuning value is in the range of −10 MHz to +10 MHz.

8. The method according to claim 6 wherein the dressing field is given by $B_x=\Omega \exp[-i(\gamma_c B_z+\Delta)t]$ where Bx is a magnitude of the dressing field, $\gamma_c$ is gyromagnetic ratio for the client quantum system, Bz is a magnitude of the first magnetic field, $\Omega$ is an amplitude of the dressing field, $\Delta$ is the detuning value, and t is time.

9. The method according to claim 1 wherein the broker quantum system and the client quantum system are respectively provided by an intrinsic spin of a first particle and an intrinsic spin of a second particle.

10. The method according to claim 9 wherein the broker quantum system comprises an electron spin and the client quantum system comprises a nuclear spin.

11. The method according to claim 10 wherein the electron spin and nuclear spin both belong to a luminescent centre in a crystalline substrate.

12. The method according to claim 1 wherein, in the dressed state the broker quantum system has a plurality of ground state energy levels and optically exciting the broker quantum system comprises controlling a light source to apply an optical pumping pulse to the client-broker system, the optical pumping pulse having a frequency corresponding to a transition from a first one of the ground state energy levels to an excited state of the broker quantum system.

13. The method according to claim 12 wherein the broker quantum system is optically coupled to an optical resonator, the optical resonator tuned to a frequency corresponding to a transition from a second one of a plurality of ground state energy levels of the broker quantum system to the excited state of the broker quantum system.

14. The method according to claim 1, wherein the dressing field has an amplitude that is at least 4 times larger than the linewidth of an optical transition used to manipulate the quantum state of the broker quantum system.

15. A controller operable to protect a quantum state of a client quantum system of a broker-client system comprising the client quantum system and a broker quantum system coupled by a hyperfine interaction, wherein the controller is operable to:

suppress the hyperfine interaction by applying an electromagnetic dressing field to the client-broker system in the presence of a first magnetic field, the electromagnetic dressing field comprising a second magnetic field that oscillates in a direction perpendicular to the first magnetic field; and while the hyperfine interaction is suppressed, alter a quantum state of the broker quantum system by performing steps including optically exciting the broker quantum system, wherein:

the dressing field has a frequency and amplitude selected to cause eigenstates of the Hamiltonian of the broker-client system to change from a bare basis made up of combinations of a pure state of the client quantum system and a pure state of the broker quantum system to a dressed basis made up of combinations of pure states of the client quantum system and coherent superpositions of original pure states of the broker quantum system.

16. The controller according to claim 15, wherein the dressing field has an amplitude that is at least 4 times larger than the linewidth of an optical transition used to manipulate the quantum state of the broker quantum system.

17. An apparatus comprising:

a broker-client system comprising a client quantum system and a broker quantum system coupled by a hyperfine interaction; and a controller operable to control the apparatus to:

suppress the hyperfine interaction by applying an electromagnetic dressing field to the client-broker system in the presence of a first magnetic field, the electromagnetic dressing field comprising a second magnetic field that oscillates in a direction perpendicular to the first magnetic field; and while the hyperfine interaction is suppressed, alter a quantum state of the broker quantum system by performing steps including optically exciting the broker quantum system wherein:

the dressing field has a frequency and amplitude selected to cause eigenstates of the Hamiltonian of the broker-client system to change from a bare basis made up of combinations of a pure state of the client quantum system and a pure state of the broker quantum system to a dressed basis made up of combinations of pure states of the client quantum system and coherent superpositions of original pure states of the broker quantum system.

18. The apparatus according to claim 17 wherein the broker quantum system comprises an electron spin and the client quantum system comprises a nuclear spin.

19. The apparatus according to claim 18 wherein the electron spin and nuclear spin both belong to a luminescent centre in a crystalline substrate.

* * * * *